July 2, 1940.  B. M. JOHNSON  2,206,192
CONTROL DEVICE FOR CAMERA AND SOUND RECORDER
Filed Jan. 9, 1939
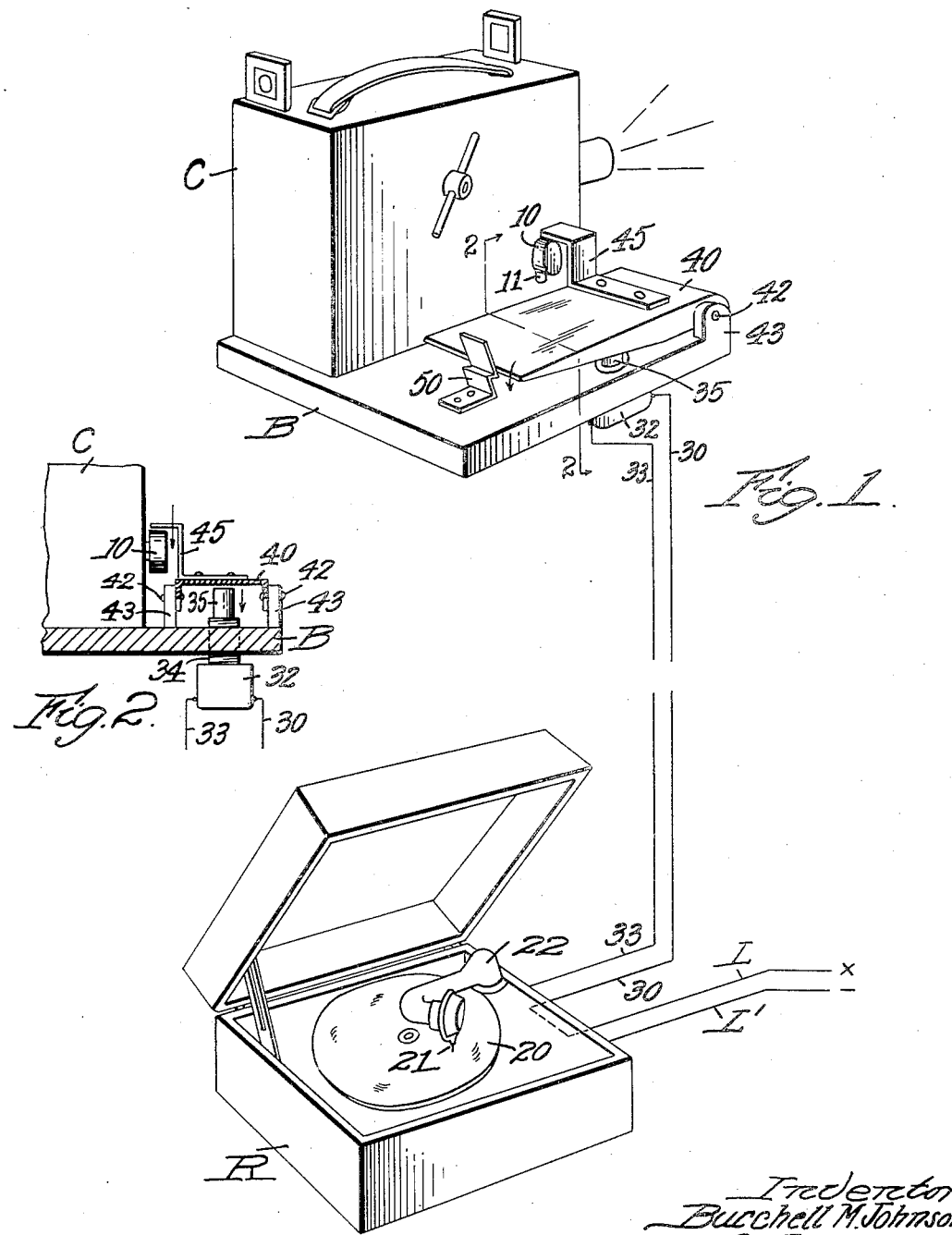

Patented July 2, 1940

2,206,192

UNITED STATES PATENT OFFICE 2,206,192

CONTROL DEVICE FOR CAMERA AND SOUND RECORDER

Burchell M. Johnson, South Sudbury, Mass., assignor of one-half to Clifton P. Howard, Worcester, Mass.

Application January 9, 1939, Serial No. 249,969

1 Claim. (Cl. 88—16.2)

This invention relates to the operative association of a small or amateur movie camera with apparatus for recording sound effects, preferably on a phonograph disc or cylinder.

Such small cameras are commonly operated by spring-driven motors, and such sound-recording apparatus is operated by its own separate motor, quite commonly electric.

It is the general object of my invention to provide a single improved control device by which a spring-driven camera motor and a separate and commonly electric sound-recorder motor may be started and stopped simultaneously.

More specifically, I provide a single control member which may be used to simultaneously start or stop a spring-driven camera motor and an electric phonograph motor by simple movements in alternate directions. I also provide means to retain said control device in closed or operative position until manually released therefrom.

My invention further relates to arrangements and combinations of parts which will be hereinafter described and more particularly pointed out in the appended claim.

A preferred form of the invention is shown in the drawing, in which

Fig. 1 is a perspective view of a camera and a sound recorder, with my invention associated therewith; and Fig. 2 is a detail sectional view, taken along the line 2—2 in Fig. 1.

Referring to the drawing, I have shown a camera C which may be taken as representative of the usual hand movie camera very commonly used for amateur purposes.

The camera C is usually provided with a control knob 10, mounted on a stud which projects through a slot 11 in the side of the camera casing. When the knob 10 is depressed, the spring motor of the camera C is released and operates the exposure mechanism of the camera, all in the usual manner. When the knob 10 is released, the knob moves upward and the motor stops.

I have also shown a sound recorder R which may be in the form of the usual phonograph, using a disc record 20 and having a recording point 21 mounted on a swinging support 22. The recorder R is commonly operated by an electric motor (not shown) and is supplied with current from feed wires L and L' which are connected to a suitable source of electricity, such as a battery or power circuit.

The wire L is shown as connected to a wire 30 which extends to one terminal of a single pole switch 32, the other terminal of said switch being connected by a wire 33 to one terminal of the phonograph motor. The wire L' is connected to the other motor terminal.

The camera C is mounted and secured on a base B, and the switch 32 is provided with a sleeve 34 which extends upward from the switch and is secured in the base B. By lengthening the wires 30 and 33, the position of the recorder R with respect to the camera C may be widely varied.

A spring-supported plunger 35 is mounted in the sleeve 34. When the plunger 35 is depressed, the switch 32 is closed, but otherwise the switch is normally open.

A sheet metal control member or lever 40 is pivoted at 42 on lugs 43 extending upward from the base B, and overlies the plunger 35 as clearly shown in Fig. 2. An offset bracket 45 on the member 40 similarly overlies the knob 10 which controls the camera C.

When the control member or lever 40 is depressed, the knob 10 will be moved downward to release the spring-driven motor in the camera C, and at the same time the plunger 35 will be depressed to close the switch 32 and start the motor in the sound recorder R.

A spring clip 50 is mounted on the base B in position to engage the end of the lever 40 as it is depressed and to retain the lever yieldingly in operative position until manually released from the clip. This renders it unnecessary to manually hold the lever 40 down during an extended period of operation.

With the simple controlling device herein shown and described, it is possible to prearrange the sound recorder to make a record, after which the operator can then give his entire attention to manipulation of the camera, being assured that whenever the camera is making exposures, the sound recorder is simultaneously producing a sound record.

Furthermore, when the operation of the camera C is interrupted, the sound recorder is instantly stopped and remains stationary until the camera is again operated.

Consequently, by the addition of my simple control device, an ordinary hand movie camera and an ordinary phonographic sound recorder may be coordinated to produce highly satisfactory sound effects to accompany the moving pictures produced by the camera.

Having thus described my invention and the advantages thereof, I do not wish to be limited to the details herein disclosed, otherwise than as set forth in the claim, but what I claim is:

In the combination of a spring motor driven movie camera having a depressible release member and an electric motor driven sound recorder spaced therefrom, that improvement which comprises the provision of a supplemental base on which said camera is mounted, a depressible control lever pivoted at one end on said base and extending alongside said camera above said base, an upwardly-extending offset arm on said lever positioned to engage and depress said camera release member, a yieldable switch on said base positioned beneath said lever and depressible to close the electric circuit of said recorder motor, and a spring latch on said base to yieldingly hold said control lever in depressed operative position, said control lever being normally held raised by said yieldable switch and being effective on manual downward movement from normal position to depress and close said switch to start said recorder motor and to simultaneously depress said release member to start said camera.

BURCHELL M. JOHNSON.